United States Patent
Moran et al.

(10) Patent No.: US 11,853,246 B2
(45) Date of Patent: Dec. 26, 2023

(54) ELECTRONIC COMMUNICATION BETWEEN DEVICES USING A PROTOCOL

(71) Applicant: International Business Machines Corporation, Armonk, NY (US)

(72) Inventors: Timothy Andrew Moran, Southampton (GB); Dominic Tomkins, Alton (GB); Warren Hawkins, Winchester (GB); Nicholas Michael O'Rourke, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/664,806

(22) Filed: May 24, 2022

(65) Prior Publication Data

US 2023/0385219 A1    Nov. 30, 2023

(51) Int. Cl.
*G06F 13/40* (2006.01)
*G06F 13/16* (2006.01)
*G06F 13/36* (2006.01)

(52) U.S. Cl.
CPC .......... *G06F 13/4022* (2013.01); *G06F 13/16* (2013.01); *G06F 13/36* (2013.01); *G06F 2213/0036* (2013.01)

(58) Field of Classification Search
CPC ...... G06F 13/4022; G06F 13/16; G06F 13/36; G06F 2213/0036
See application file for complete search history.

(56) References Cited

U.S. PATENT DOCUMENTS

| 8,694,723 | B2* | 4/2014 | Chakhaiyar | G06F 13/385 |
| | | | | 711/114 |
| 8,898,346 | B1* | 11/2014 | Simmons | G06F 13/102 |
| | | | | 710/62 |
| 9,237,057 | B1* | 1/2016 | Pittman | H04L 67/1097 |

(Continued)

OTHER PUBLICATIONS

Anonymous, "Unique Method and System to Identify Host and Configure them in SAN Controller", An IP.com Prior Art Database Technical Disclosure, IP.com No. IPCOM000214693D, IP.com Electronic Publication Date: Feb. 3, 2012, 9 pages, <https://priorart.ip.com/IPCOM/000214693>.

(Continued)

*Primary Examiner* — Henry Tsai
*Assistant Examiner* — Christopher A Daley
(74) *Attorney, Agent, or Firm* — Michael A. Petrocelli

(57) ABSTRACT

Communication between target devices using protocol commands being carried out by a target device includes accessing a key for mapping of a plurality of defined patterns of stimuli and defined patterns of resultant protocol commands to a plurality of messages. A defined pattern of stimuli is sent from a target device to an initiator device to prompt a resultant defined pattern of protocol commands to be sent from the initiator device to all target devices that identify as the same device. The protocol commands including Small Computer System Interface (SCSI) specification compliant commands. A selected pattern of protocol command stimuli is sent from a first target device to the initiator device to prompt a resultant pattern of protocol commands from the initiator device to all target devices that identify as the same device thereby communicating the mapped message to other target devices.

15 Claims, 8 Drawing Sheets

(56) References Cited

U.S. PATENT DOCUMENTS

| | | | |
|---|---|---|---|
| 9,276,786 B2* | 3/2016 | Johnson | H03F 3/19 |
| 9,712,427 B1* | 7/2017 | Pittman | H04L 45/22 |
| 2007/0156926 A1* | 7/2007 | Burgess | H04L 12/4625 |
| | | | 709/249 |
| 2011/0314141 A1* | 12/2011 | Jibbe | H04L 69/08 |
| | | | 709/224 |
| 2012/0278551 A1 | 11/2012 | Chakhaiyar | |
| 2015/0293708 A1 | 10/2015 | Lang | |
| 2016/0154608 A1 | 6/2016 | Li-On | |

OTHER PUBLICATIONS

Mell, et al., "The NIST Definition of Cloud Computing", National Institute of Standards and Technology, Special Publication 800-145, Sep. 2011, 7 pages.

* cited by examiner

US 11,853,246 B2

ELECTRONIC COMMUNICATION BETWEEN DEVICES USING A PROTOCOL

BACKGROUND

The present invention generally relates to communication between target devices, and more particularly, to communication between target devices using protocol commands.

Current storage systems require a dedicated management interface in order to communicate with one another. Typically, this management interface is dependent upon an Internet Protocol network to facilitate the communication. It would be useful for two storage controllers that are each serving the same host to communicate with each other. Existing solutions require either outside orchestration or an inter-cluster communication method.

SUMMARY

According to an aspect of the present invention there is provided a computer-implemented method for communication between target devices using known protocol commands, said method carried out by one or more processors of a computer system of a target device and including: accessing a key for mapping of a plurality of defined patterns of stimuli and defined patterns of resultant protocol commands to a plurality of messages, a defined pattern of stimuli is sent from a target device to an initiator device to prompt a resultant defined pattern of protocol commands to be sent from the initiator device to all target devices that identify as the same device, the protocol commands are Small Computer System Interface (SCSI) specification compliant commands; and sending a selected pattern of protocol command stimuli from a first target device to the initiator device to prompt a resultant pattern of protocol commands from the initiator device to all target devices that identify as the same device thereby communicating the mapped message to other target devices.

According to another aspect of the present invention there is provided a computer-implemented method for communication between target devices using known protocol commands, said method carried out by one or more processors of a computer system of a target device and including: accessing for mapping of a plurality of defined patterns of stimuli and defined patterns of resultant protocol commands to a plurality of messages, a defined pattern of stimuli is sent from a target device to an initiator device to prompt a resultant defined pattern of protocol commands to be sent from the initiator device to all target devices that identify as the same device, the protocol commands are Small Computer System Interface (SCSI) specification compliant commands; receiving at a second target device one of the defined patterns of protocol commands from the initiator device; and interpreting the defined pattern by using the key to obtain the mapped message.

According to a further aspect of the present invention there is provided a system for communication between target devices using known protocol commands, said system including a target device including: a processor and a memory configured to provide computer program instructions to the processor to execute the function of the components; a key accessing component for accessing a for mapping of a plurality of defined patterns of stimuli and defined patterns of resultant protocol commands to a plurality of messages, a defined pattern of stimuli is sent from a target device to an initiator device to prompt a resultant defined pattern of protocol commands to be sent from the initiator device to all target devices that identify as the same device, the protocol commands are Small Computer System Interface (SCSI) specification compliant commands; a stimuli sending component for sending a selected pattern of protocol command stimuli from a first target device to the initiator device to prompt a resultant pattern of protocol commands from the initiator device to all target devices that identify as the same device thereby communicating the mapped message to other target devices.

According to a further aspect of the present invention there is provided a computer program product for communication between target devices using known protocol commands, the computer program product including a computer readable storage medium having program instructions embodied therewith, the program instructions executable by a processor to cause the processor to: access a key for mapping of a plurality of defined patterns of stimuli and defined patterns of resultant protocol commands to a plurality of messages, a defined pattern of stimuli is sent from a target device to an initiator device to prompt a resultant defined pattern of protocol commands to be sent from the initiator device to all target devices that identify as the same device, the protocol commands are Small Computer System Interface (SCSI) specification compliant commands; and send a selected pattern of protocol command stimuli from a first target device to the initiator device to prompt a resultant pattern of protocol commands from the initiator device to all target devices that identify as the same device thereby communicating the mapped message to other target devices.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings, in which.

Figure 1:
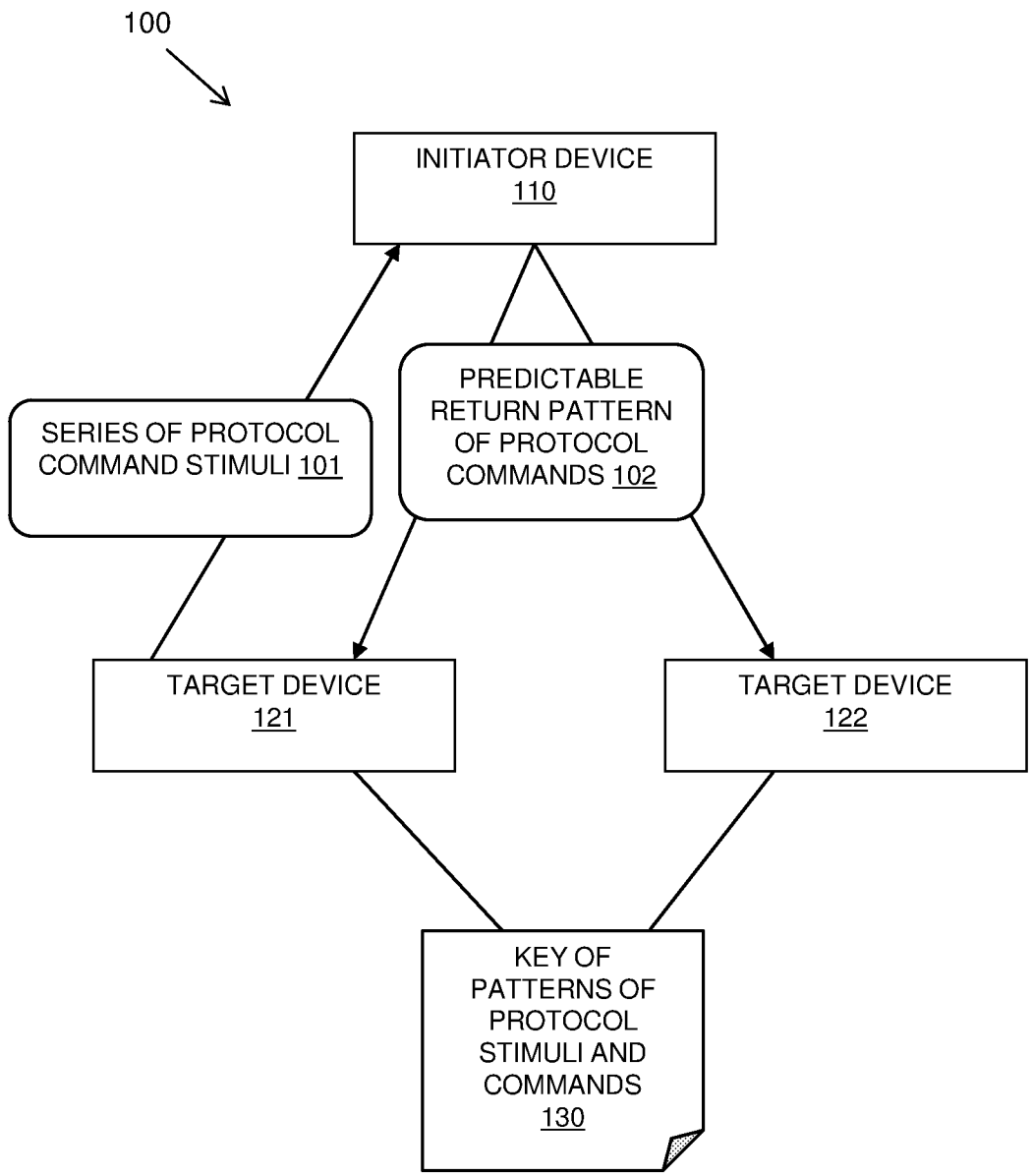
FIG. 1 is a schematic diagram of an example embodiment of a method and system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of a method, system, and computer program product are provided for communication between target devices using known protocol commands; specifically, using Small Computer System Interface (SCSI) specification compliant commands.

SCSI is a widely used protocol that includes a set of standards for physically connecting and transferring data between computers and peripheral devices. The SCSI standard defines command sets for specific peripheral device types.

Internet Small Computer Systems Interface (iSCSI) is an Internet Protocol (IP) based storage networking standard for linking data storage facilities. iSCSI provides block-level access to storage devices by carrying SCSI commands over a TCP/IP network. iSCSI facilitates data transfers over intranets and to manage storage over long distances. It can be used to transmit data over local area networks (LANs), wide area networks (WANs), or the Internet and can enable location-independent data storage and retrieval. The iSCSI protocol allows clients (called initiators) to send SCSI commands to storage devices (targets) on remote servers. It is a storage area network (SAN) protocol, that allows organizations to consolidate storage into storage arrays while providing clients (such as database and web servers) with the illusion of locally attached SCSI disks.

The described method and system allow SCSI target devices to communicate with each other by exploiting the predictable behavior of a SCSI initiator that is connected to both or many SCSI target devices.

The SCSI target devices may communicate using the described method if they identify as the same device. Devices on each system will respond with the same identifier to any host discovery commands used to identify the devices. For example, by responding with the same value in the Vendor Specific Identifier field in its Device Identification Virtual Product Data (VPD) page (returned in response to a SCSI Inquiry command).

The method sends a series of protocol command stimuli in a pattern from a first target device to an initiator device. The series of protocol command stimuli prompts one of a set of defined patterns of protocol commands to be sent from the initiator device to be received by all target devices that receive the initiator commands.

A key is provided that is accessible to the target devices of the set of the plurality of defined stimuli and resultant patterns of protocol commands mapped into a plurality of messages. Therefore, sending a pattern of stimuli from a target device and receiving a pattern of protocol commands at another target device communicates the mapped message. In this way, a mapped message received at a second target device is triggered by the pattern of protocol command stimuli sent by a first target device. This forms a SCSI steganography that conveys messages between SCSI targets.

In the storage field, the described method and system enable two storage controllers that are each serving the same host to communicate with each other by exploiting the SCSI specification compliant response behavior of the host to a status condition to convey additional information between the two storage controllers connected to that host.

Exploiting SCSI specification compliant response behavior of the host to a status condition is used as a communication mechanism between storage controllers where a SCSI target volume exists on more than one first storage controller and is mapped to the same SCSI initiator (host) on both storage controllers.

As an example, a SCSI target device raising Unit Attentions expects to provoke a SCSI initiator device to send a predictable command down all paths to the SCSI target. For example, raising an Asymmetric Access States Changed unit attention prompts a host to send a Report Target Port Groups command down all its paths to the volume.

The predictable response of a host to a pattern of unit attentions is used to send a predictable sequence of SCSI commands to other storage controllers, allowing different storage controllers to pass messages to each other using this predictable pattern of response.

The communication between target devices is an improvement in the technical field of computer communication generally and more particularly in the technical field of communication between SCSI target devices.

Referring to FIG. 1, a schematic diagram 100 shows an example embodiment of the described method and system.

Target devices 121, 122 are provided with access to a key 130 of defined patterns of stimuli and resultant defined patterns of protocol commands mapping to a plurality of messages. A defined pattern of stimuli and a resultant defined pattern of protocol commands map to the same message. Access to a key 130 may be provided by: installing the key in each storage controller software at upgrade time; configuring the key in each storage controller by an administrator; or sending the key to each storage controller by a host initiator. Any means of communicating with both storage controllers may be used to set up and update the keys.

The patterns of stimuli are used by target devices 121, 122 to send a message by prompting an initiator device 110 to respond with a pattern of protocol commands. The patterns of protocol commands are capable of being received at each of the target devices 121, 122 from the initiator device 110 and interpreted into the message using the key 130. The protocol commands are SCSI specification compliant commands.

A first target device 121 sends a pattern of protocol command stimuli 101 from a first target device 121 to the initiator device 110 to prompt one of the defined patterns 102 of protocol commands from the initiator device 110 thereby communicating the mapped message to other target devices 122 that identify as the same device. The plurality of defined patterns may be an ordered sequence of different commands and/or may be a time-separated sequence with the time-separations between commands forming a pattern.

The stimuli 101 are sent when the first target device 121 is receiving a continuous stream of sufficiently frequent commands from the initiator device 110. In the SCSI Initiator-Target model, the target can only respond with one of the stimuli to a message that has been received from the initiator. So, although the first target device 121 has absolute control over the order in which the stimuli are raised, they can only be sent when an initiator message is received. The commands received from the initiator device 110 may be a stream of high frequency IO (for example, SCSI Read and Write commands being issued within milliseconds of each other). The commands may alternatively be less frequent commands like periodic Test Unit Ready commands, which most hosts are expected to send. In this case a message could still be conveyed, but the sequence of messages may take several seconds or even minutes to send.

As an example: an Asymmetric Access State Changed (AASC) unit attention stimulus, should result in host issuing Maintenance In (Report Target Port Groups (RTPG)) command down each path to the 'device'—which are actually the device on each system, identifying as the same device. In another example, an Inquiry Data Has Changed stimulus, should result in the host issuing Inquiry down each path. Each of these commands is a discovery style command that tends to be issued when a host first logs in, but is then encountered infrequently during normal operations. Therefore, a predictable pattern/sequence of these stimulus/responses in a defined period of time has a high probability of conveying the intended message.

The target device 122 receiving one of the defined patterns of protocol commands from the initiator device interprets the defined pattern 102 by using the key 130 to obtain the mapped message.

Figure 2:
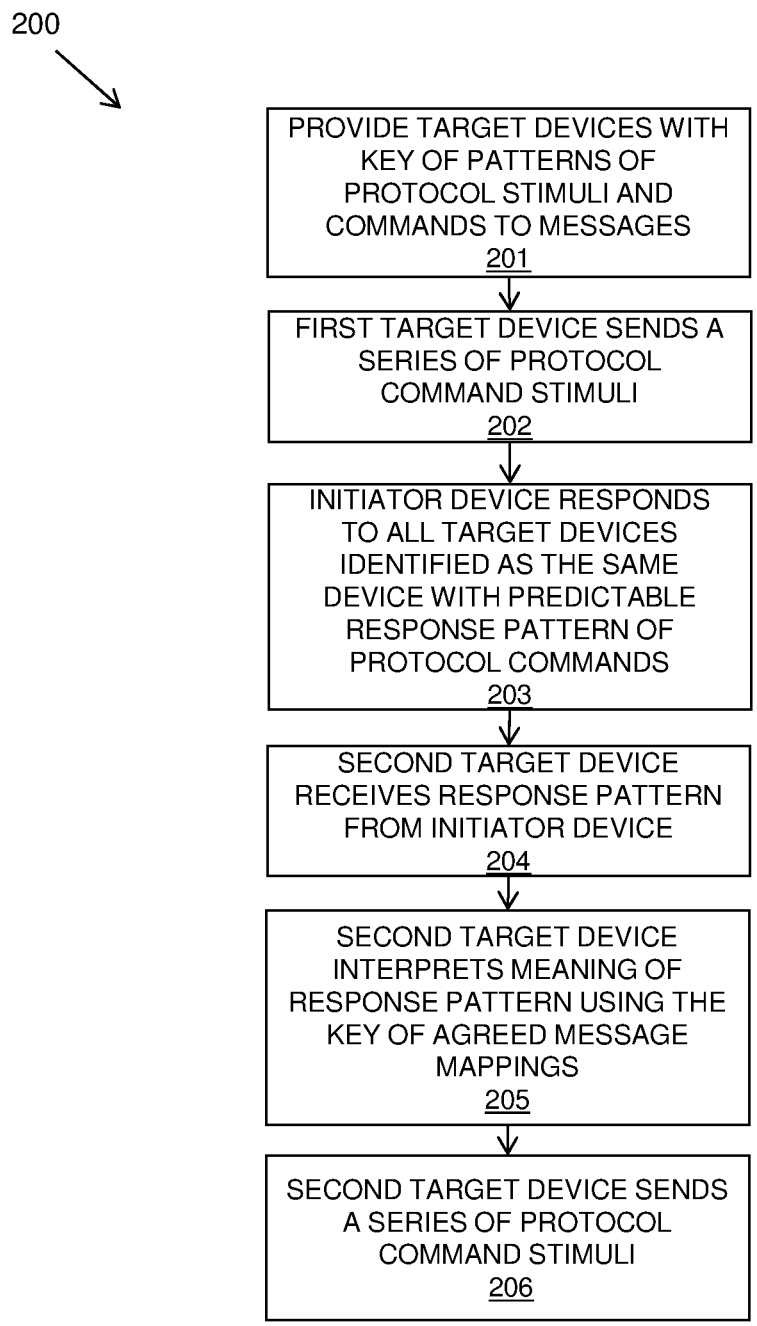
FIG. 2 is a flow diagram of an example embodiment of a method in accordance with embodiments of the present invention.

Referring to FIG. 2, a flow diagram 200 shows an example embodiment of the described method.

The method may provide at 201 the target devices with a key for mapping a plurality of defined patterns of stimuli and defined patterns of resultant protocol commands to a plurality of messages. The pattern of resultant protocol commands is capable of being received at a target device from an initiator device and interpreted as a message. The protocol commands are SCSI specification compliant commands.

A first target device sends at 202 a selected pattern of protocol command stimuli to an initiator device. The initiator device responds at 203 with a defined pattern of protocol commands from the initiator device to other target devices that identify as the same device.

A second target device is among the target devices that receives at 204 the response from the initiator device. The second target device interprets at 205 the received pattern using the key mapping the pattern to a message meaning.

The second target device upon receiving a first command of a series of protocol commands from the initiator device may enter a message recognition state ready to interpret at 205 the pattern of protocol commands.

The described method is useful without the second target device confirming that it has received the message. However, the second target device may send at 206 a selected pattern of protocol command stimuli in response that in turn prompts the initiator device to send a response pattern to all the target devices, including the first target device that receives it and interprets the response message from the second target device.

The first target device may send an initial prompt to the initiator device to confirm that the initiator device is issuing commands in a timeous manner before sending at 202 the pattern of protocol command stimuli.

The stimuli of the SCSI target device may raise unit attentions that expect to provoke a SCSI initiator device to send a predictable command down all paths to the SCSI target. For example: raising an Asymmetric Access States Changed unit attention will prompt a host to send a Report Target Port Groups command down all its paths to the volume.

The host is unaware that the unit attentions are being used to send the message pattern, so it is expected that the host will respond to each unit attention in a manner consistent with the specification, as if the unit attention had been raised for other reasons. By restricting the unit attentions used to convey the message to unit attentions that will prompt discovery style commands, the host response should be non-disruptive. For example, the host may issue some additional Inquiry or Report Target Port Groups (in an observable pattern that matches a message key), and the targets respond to these as normal (re-identifying the device/ports with the usual response).

Figure 3:
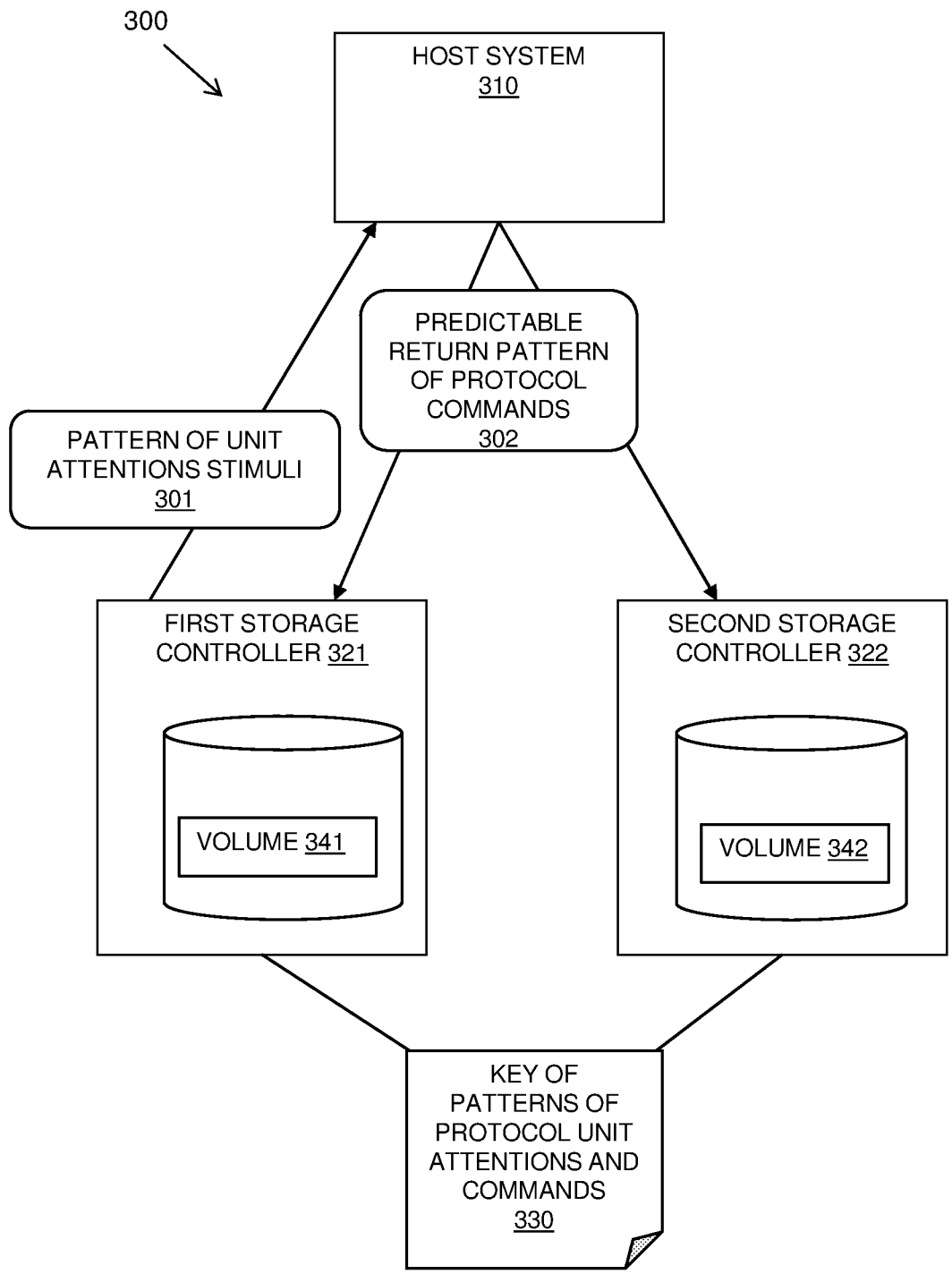
FIG. 3 is a schematic diagram of another example embodiment of a method and system in accordance with embodiments of the present invention.

Referring to FIG. 3, a schematic diagram 300 shows an example embodiment of the described method and system in the context of storage controllers 321, 322 as target devices and a host system 310 as an initiator device. The described method is used as a communication mechanism between storage controllers 321, 322, in the case where a SCSI target volume 341, 342 exists on more than one storage controller 321, 322 and is mapped to the same SCSI initiator in the form of the host system 310 on the storage controllers 321, 322.

The storage controllers 321, 322 share a key 330 of defined patterns of stimuli in the form of Unit Attentions and resultant defined patterns of protocol commands mapping to a plurality of messages. A defined pattern of Unit Attentions and a resultant defined pattern of protocol command responses map to the same message.

A pattern 301 of Unit Attentions presented by the volume 341 on a first storage controller 321 prompt the host system 310 to send a predictable pattern 302 of SCSI commands to that volume 341, 342 on both the first storage controller 321 and a second storage controller 322. The first storage controller 321 can see this pattern 302 of commands and have at least some confidence that the same pattern 302 has been seen by the second storage controller 322. In response, the second storage controller 322 can then raise some pattern of Unit Attentions to prompt its own message. This sequence can be repeated to allow two-way communication between the storage controller clusters, with different patterns of Unit Attentions used to convey different messages.

This provides a communication method in the event that other methods of communicating between the storage controller clusters are unavailable, unreliable or compromised.

One application of this method may include confirming that a host system 310 has successfully connected to an active-passive volume 342 on a second storage controller 322 before switching the direction of the active-passive volume 342, which could prevent a host system 310 losing access to a misconfigured active-passive volume 342.

Figure 4:
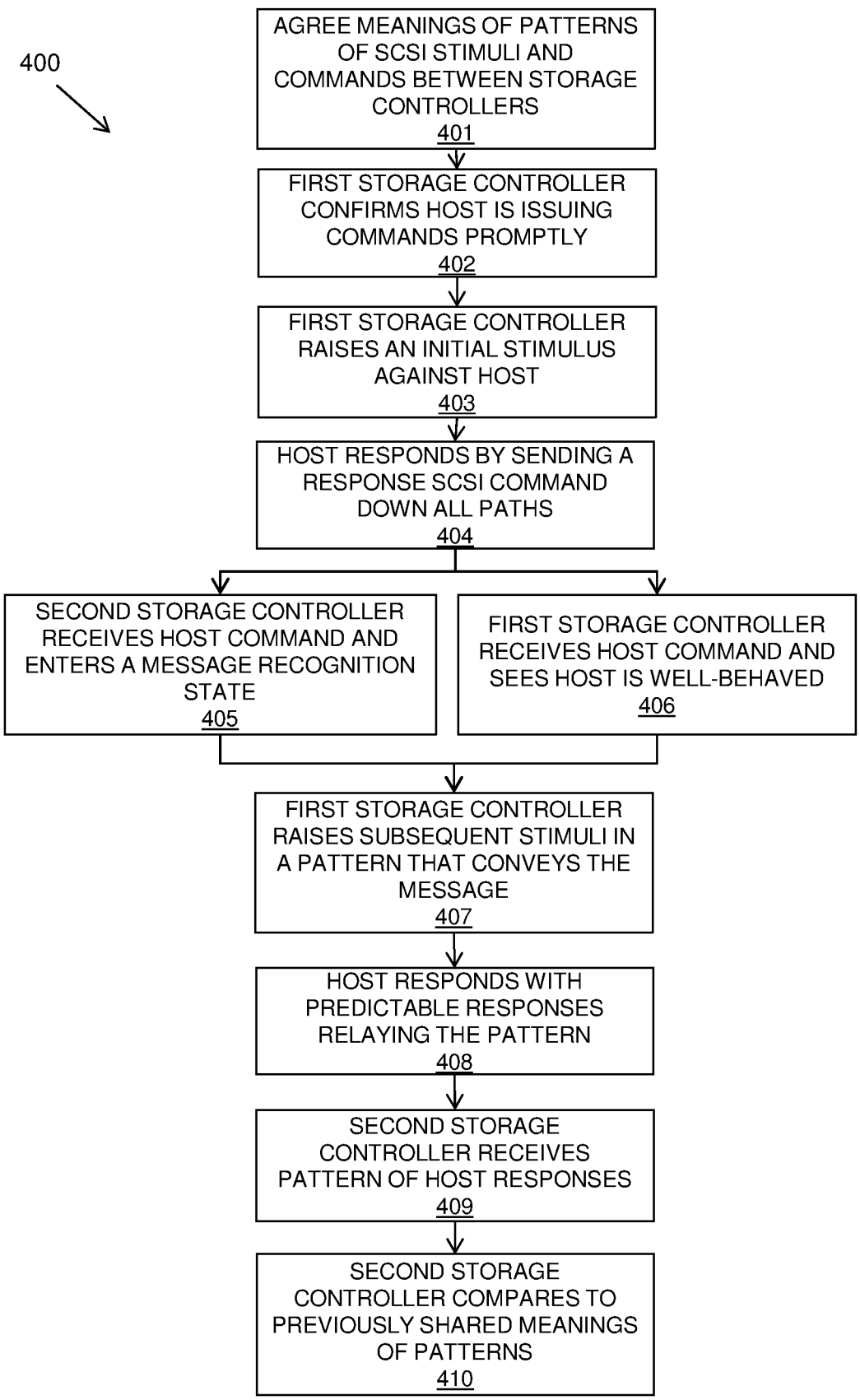
FIG. 4 is a flow diagram of another example embodiment of a method in accordance with embodiments of the present invention at a first target device.

Referring to FIG. 4, a flow diagram 400 shows an example embodiment of the described method as carried out in the arrangement of FIG. 3 of first and second storage controllers 321, 322 and a host system 310.

Meanings of patterns of stimuli and responding patterns of commands are agreed 401 between the storage controllers 321, 322 through a key in the form of a shared codebook.

The first storage controller 321 has a message that it wishes to convey to a second storage controller 322. The host system 310 has successfully discovered volumes 341 on the first storage controller 321.

The first storage controller 321 confirms at 402 that the host system 310 is issuing SCSI commands frequently enough that it will respond in a timely manner to Unit Attentions. This may send a trial stimulus that is recognized as not being part of the stimuli for a message.

The first storage controller 321 raises an initial stimulus in the form of a Unit Attention against the host system 310 (for example, this may be an Asymmetric Access State Changed Unit Attention (AASC)). That host system 310 responds at 404 to the Unit Attention by sending a response SCSI command down all paths (for example, a Report Target Port Groups command in response to the AASC).

The second storage controller 322 receives at 405 this SCSI command. Since it is the first command in a potential message sequence, the second storage controller 322 enters a message recognition state. In the message recognition state, the second target device may collect the pattern of protocol commands for comparison with the key.

The first storage controller 321 also receives at 406 this SCSI command, and sees that the host is well-behaved in its response to the initial stimulus.

The first storage controller 321 raises at 407 subsequent stimuli in a pattern that conveys the message. This may be any ordered sequence of different Unit Attentions that provoke a predictable SCSI command. Alternatively or additionally, this may be a 'rhythm' of time-separated Unit Attentions that provoke a predictable time-separated sequence of SCSI commands.

The host system 310 responds at 408 with the predictable responses relaying the pattern.

The second storage controller receives at 409 each of the response SCSI commands in the ordered sequence or time-separated rhythm provoked by first storage controller 322. This sequence is compared at 410 to the shared codebook to interpret the message that the first storage controller 321 has sent.

This is useful even without confirming that the second storage controller 322 has received the message. However, the sequence may now be repeated with the roles of the first and second storage controllers 321, 322 reversed. The second storage controller may raise a Unit Attention sequence that will provoke a sequence of SCSI commands that the first storage controller will receive, and this sequence can confirm to the first storage controller that the second storage controller has received the message and may include an additional message from the second storage controller 322 to the first storage controller 321.

The following is an example of the step of confirming at 402 that the host is issuing commands promptly. If a login is currently active (i.e. is frequently receiving commands), it is expected that a host will promptly respond to any unit attention raised on that login. The first storage controller 321 trying to send the message using this method may raise unit attentions on an active login. It may then verify that the predicted response is received from the host (i.e. if an AASC is raised, is an RTPG seen). This gives confidence that the other system has also seen this message.

One defined sequence in the shared key may establish a handshake to allow the other system to confirm that it also has an active login. For example, system A raises three AASC unit attentions within a minute, verifying that three RTPG commands are seen in response. System A then waits. If System B sees all three RTPG commands within that minute, it can now respond by raising three AASC unit attentions itself. System A will see a further three RTPG commands (without having issued any further AASC unit attentions on system A) and conclude that System B has seen its own message.

The following is an example of receiving a message in the message recognition state of step 405. The message pattern is some sequence of SCSI commands provoked by the corresponding stimuli in a predictable time sequence. When the first command in any message pattern is seen, a target device will expect the second command in that message pattern at a predictable time, with some small margin of error to account for the established amount of host activity. If that second command is received within that predicted time interval, it will expect the third command. If all commands are received at the expected time, the system treats the commands as having been provoked by the other system sending the message pattern. If any of the commands in the message pattern does not arrive when expected, the system concludes that the other system has not sent the message pattern. Additionally, if any other commands used in the message pattern are received at unexpected time intervals, the system may conclude that the other system has not sent the message pattern.

As an example, the message sent by System A may be an AASC unit attention, followed by a shorter delay (e.g. 4 seconds), followed by a second AASC unit attention, followed by a longer delay (e.g. 8 seconds), followed by an Inquiry Data Changed unit attention, followed by a shorter delay (e.g. 4 seconds), followed by a third AASC unit attention. The host is expected to respond to Unit Attentions within a shorter time interval (e.g. 0.1 seconds).

System B receives a RTPG command from the host, so a command pattern receiving component considers further commands from that host. If the host sends another RTPG command after 4.05 seconds, an Inquiry command after 12.1 seconds and another RTPG command after 16.15 seconds, System B concludes that System A has sent this message pattern and interprets the message from the key. If any of these commands is missing, late or (optionally) early or repeated, System B will conclude that these commands are not due to a message pattern sent from System A (although each of the RTPGs in the sequence will also be tested as the potential first command in the message pattern, or any other message pattern starting with an AASC/RTPG).

Figure 5:
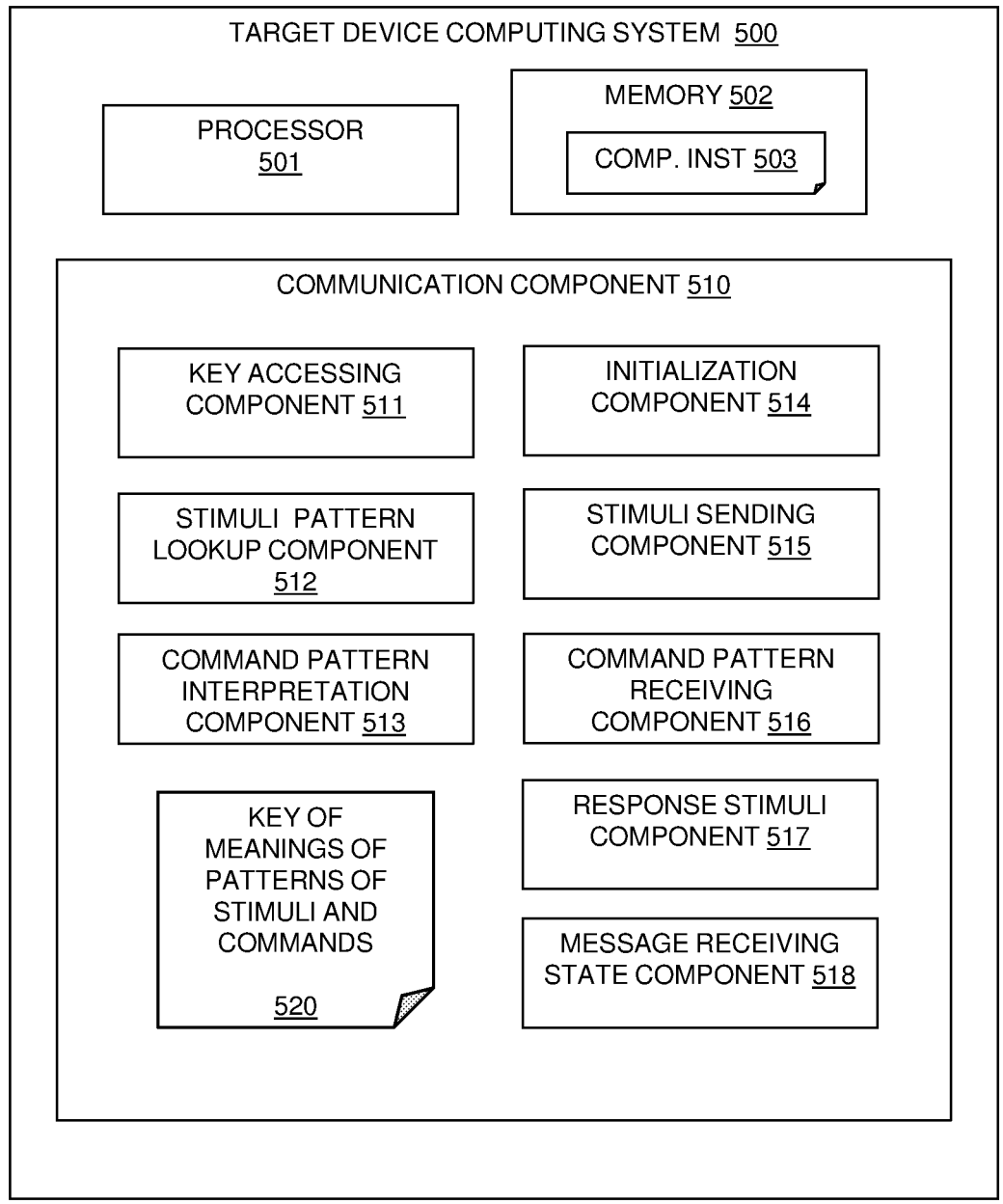
FIG. 5 is a block diagram of an embodiment of a computer system in which embodiments of the present invention may be implemented.

Referring to FIG. 5, a block diagram shows a target device computing system 500 at which the described system may be implemented.

The target device computing system 500 includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The target device computing system 500 includes a communication component 510 for communication between target devices. The communication component 510 provides functionality for sending the pattern of stimuli and receiving the response protocol commands and can therefore act as the first or second target device.

The communication component 510 includes a key accessing component 511 for accessing a key 520 for mapping of a plurality of defined patterns of stimuli and resultant protocol commands to a plurality of messages. The patterns of stimuli are capable of being sent by a target device to an initiator device and the patterns of protocol commands are capable of being received at a target device from the initiator device, where the protocol commands are Small Computer System Interface (SCSI) specification compliant commands.

The communication component 510 may include an initialization component 514 for sending an initial prompt from the target device to an initiator device to confirm that the initiator device is issuing commands in a timeous manner before sending the series of protocol command stimuli.

The communication component 510 includes a stimuli sending component 515 for sending a series of protocol command stimuli from the target device to the initiator device. The stimuli sending component 515 may use a stimuli pattern lookup component 512 to look up the required stimuli pattern to send a required message using the key 520.

The communication component 510 includes a command pattern receiving component 516 for receiving at the target device one of the defined patterns of protocol commands from the initiator device and a command pattern interpretation component 513 for interpreting the defined pattern by using the key 520 to obtain the mapped message.

The communication component 510 may include a message receiving state component 518 for, on receiving a first command of a series of protocol commands from the initiator device, entering the target device into a message recognition state.

The communication component 510 may include a response stimuli component 517 for responding to a received mapped message by sending a further series of protocol command stimuli from the target device to the initiator device.

Figure 6:
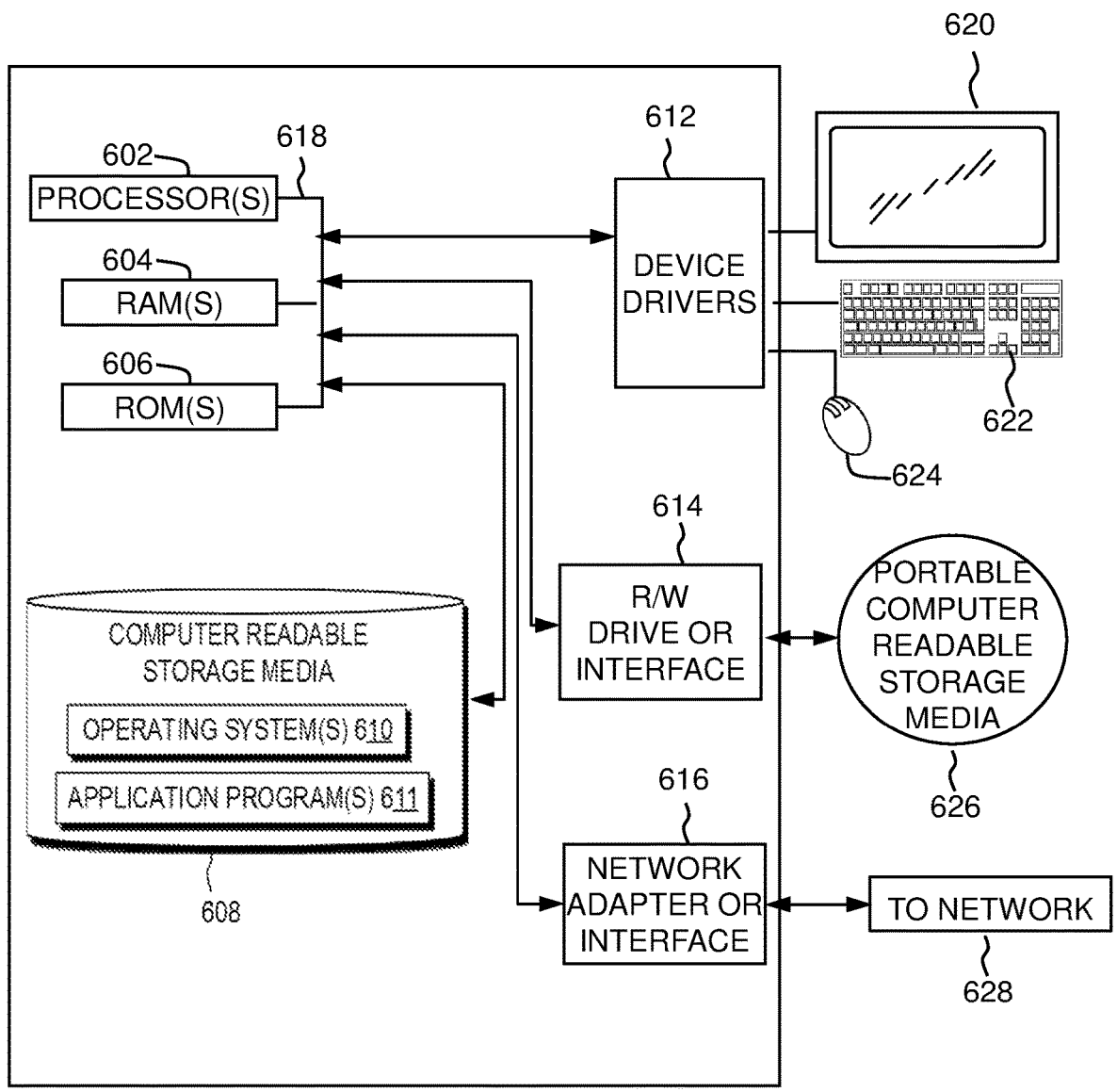
FIG. 6 is a block diagram of an embodiment of a computer system or cloud server in which embodiments of the present invention may be implemented.

FIG. 6 depicts a block diagram of components of a computing system as used for the target device computing system 500, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610 and application programs 611 are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a RAY drive or interface 614 to read from and write to one or more portable computer readable storage media 626. Application programs 611 on the computing system can be stored on one or more of the portable computer readable storage media 626, read via the respective RAY drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network 628 (for example, the Internet, a local area network or other wide area networks or wireless networks) and network adapter or interface 616. From the network adapter or interface 616, the programs may be loaded into the computer readable storage media 608. The network 628 may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing:

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
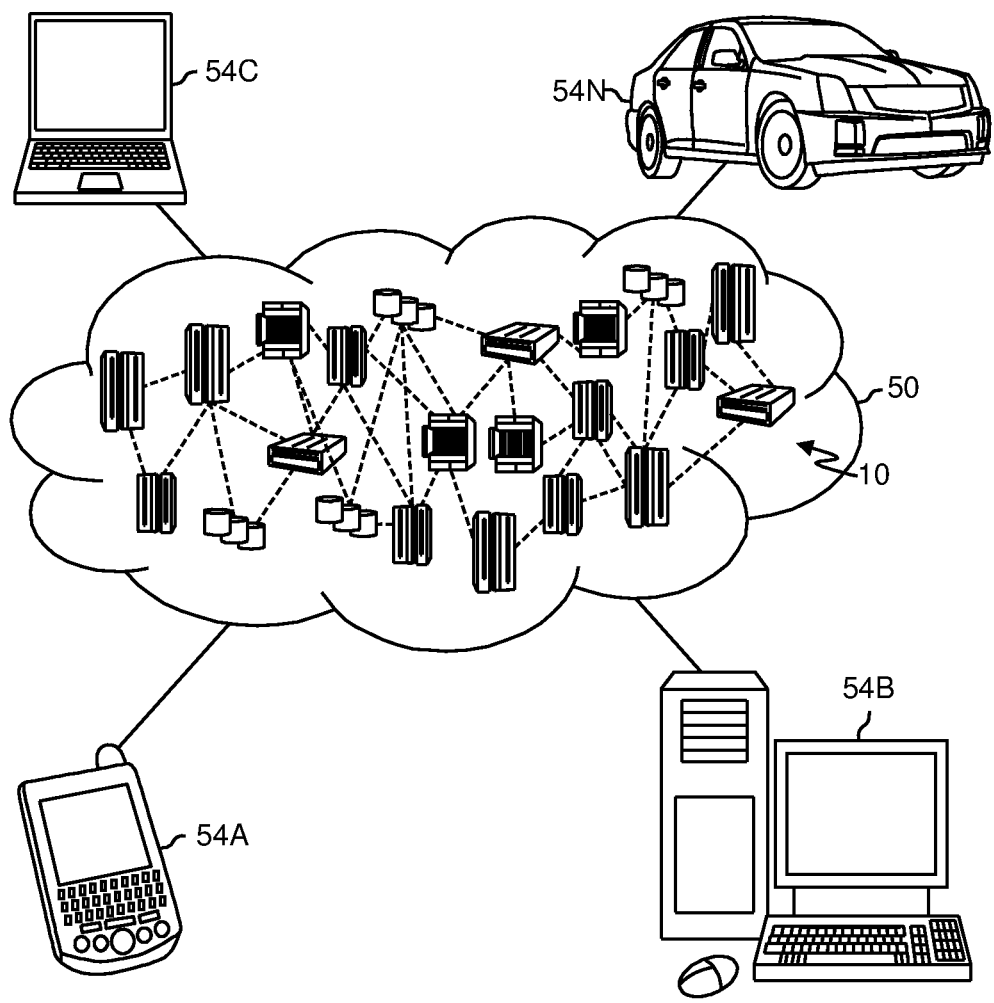
FIG. 7 is a schematic diagram of a cloud computing environment in which embodiments of the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
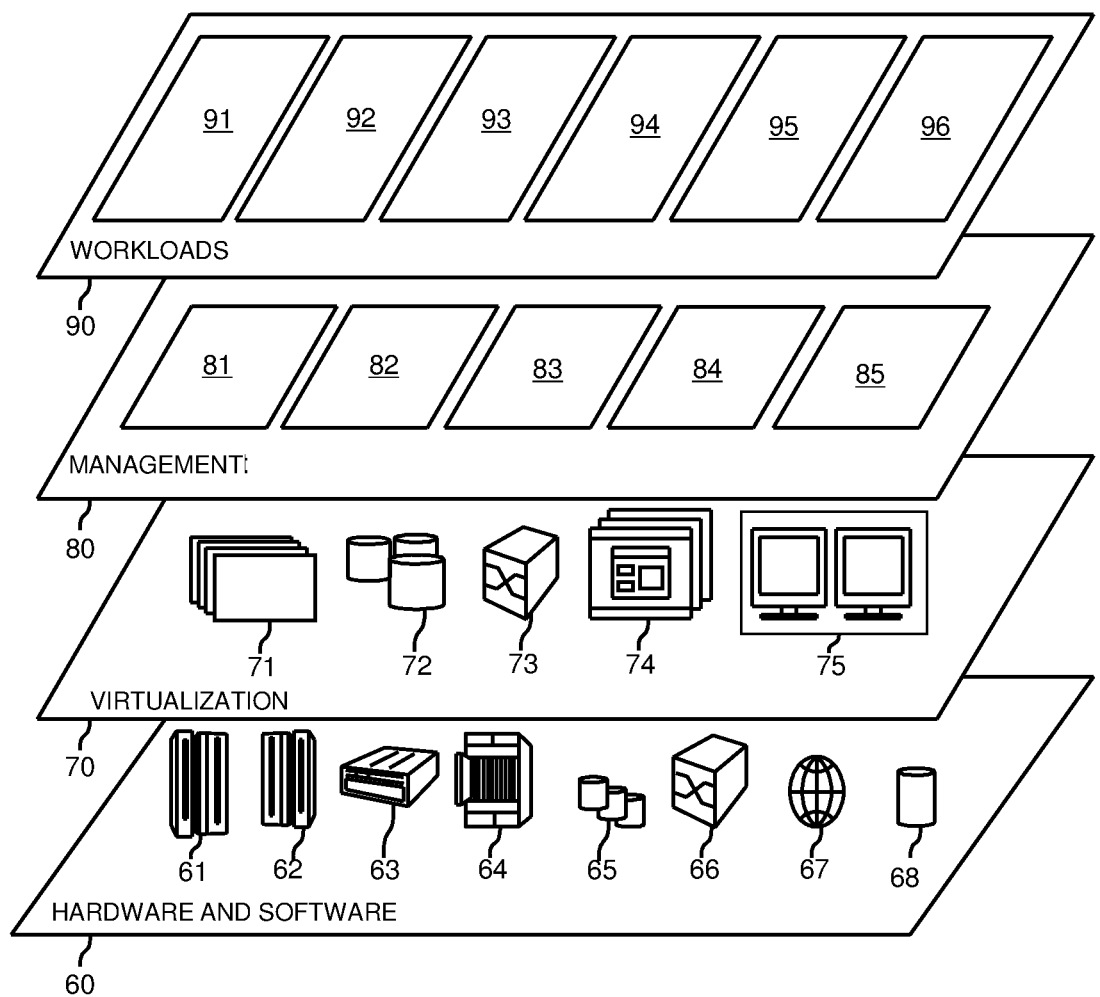
FIG. 8 is a diagram of abstraction model layers of a cloud computing environment in which embodiments of the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for communication between target devices, the method being carried out by one or more processors of a computer system of a target device and comprising:
   accessing a key for mapping of a plurality of defined patterns of stimuli and defined patterns of resultant protocol commands to a plurality of messages, wherein a defined pattern of stimuli is sent from a target device to an initiator device to prompt a resultant defined pattern of protocol commands to be sent from the initiator device to all target devices that identify as the same device, wherein the protocol commands are Small Computer System Interface (SCSI) specification compliant commands;
   sending a selected pattern of protocol command stimuli from a first target device to the initiator device to prompt a resultant pattern of protocol commands from the initiator device to all target devices that identify as the same device for communicating a mapped message to other target devices, the protocol command stimuli including unit attentions for provoking the initiator device to send a predictable command down all paths to the target device; and
   sending an initial prompt from the target device to the initiator device to confirm that the initiator device is issuing commands in a timeous manner before sending the selected pattern of protocol command stimuli.

2. The method of claim 1, wherein sending the selected pattern of protocol command stimuli is in response to a stream of frequent commands from the initiator device.

3. The method of claim 1, wherein the plurality of defined patterns includes at least one of an ordered sequence of commands and a time-separated sequence with the time-separations forming a pattern.

4. The method of claim 1, further comprising:
   receiving at a first target device one of the defined patterns of protocol commands from the initiator device; and
   interpreting the defined pattern by using the key to obtain the mapped message.

5. The method of claim 4, further comprising:
   responding to a received mapped message by sending a further pattern of protocol command stimuli from the first target device to the initiator device.

6. The method of claim 1, wherein the initiator device is a host computer system and the target devices are storage controllers sharing a common volume.

7. A computer-implemented method for communication between target devices, the method carried out by one or more processors of a computer system of a target device and comprising:
   accessing a key for mapping of a plurality of defined patterns of stimuli and defined patterns of resultant protocol commands to a plurality of messages, wherein a defined pattern of stimuli is sent from a target device to an initiator device to prompt a resultant defined pattern of protocol commands to be sent from the initiator device to all target devices that identify as the same device, wherein the protocol commands are Small Computer System Interface (SCSI) specification compliant commands;
   receiving at a second target device one of the defined patterns of protocol commands from the initiator device;
   interpreting the defined pattern by using the key to obtain the mapped message;
   responding to a received mapped message by sending a pattern of protocol command stimuli from the second target device to the initiator device, the protocol command stimuli including unit attentions for provoking the initiator device to send a predictable command down all paths to the target device; and
   sending an initial prompt from the target device to the initiator device to confirm that the initiator device is issuing commands in a timeous manner before sending the pattern of protocol command stimuli.

8. The method of claim 7, further comprising:
   on receiving a first command of a pattern of protocol commands from the initiator device, entering a message recognition state.

9. A system for communication between target devices using known protocol commands, said system comprising a target device including:
   a processor and a memory configured to provide computer program instructions to the processor to execute the function of the components;
   a key accessing component for accessing a key for mapping of a plurality of defined patterns of stimuli and defined patterns of resultant protocol commands to a plurality of messages, wherein a defined pattern of stimuli is sent from a target device to an initiator device to prompt a resultant defined pattern of protocol commands to be sent from the initiator device to all target devices that identify as the same device, wherein the protocol commands are Small Computer System Interface (SCSI) specification compliant commands;
   a stimuli sending component for sending a selected pattern of protocol command stimuli from a first target device to the initiator device to prompt a resultant pattern of protocol commands from the initiator device to all target devices that identify as the same device for communicating the mapped message to other target devices, the protocol command stimuli including unit attentions for provoking the initiator device to send a predictable command down all paths to the target device; and an initialization component for sending an initial prompt from the target device to the initiator device to confirm that the initiator device is issuing commands in a timeous manner before sending the selected pattern of protocol command stimuli.

10. The system of claim 9, wherein the key mapping includes the plurality of defined patterns in the form of ordered sequences of commands and/or time-separated sequences with the time-separations forming a pattern.

11. The system of claim 9, further comprising:
a command pattern receiving component for receiving at the target device one of the defined patterns of protocol commands from the initiator device; and
a command pattern interpretation component for interpreting the defined pattern by using the key to obtain the mapped message.

12. The system of claim 11, further comprising:
a message receiving state component for, on receiving a first command of a pattern of protocol commands from the initiator device, entering a message recognition state.

13. The system of claim 11, further comprising:
a response stimuli component for responding to a received mapped message by sending a further pattern of protocol command stimuli from the target device to the initiator device.

14. The system of claim 9, wherein the protocol command stimuli include unit attentions.

15. The system of claim 9, wherein the initiator device is a host computer system and the target devices are storage controllers, wherein a SCSI target volume exists on more than one first storage controller and is mapped to the same host computer system on the storage controllers.

\* \* \* \* \*